Figure 1:
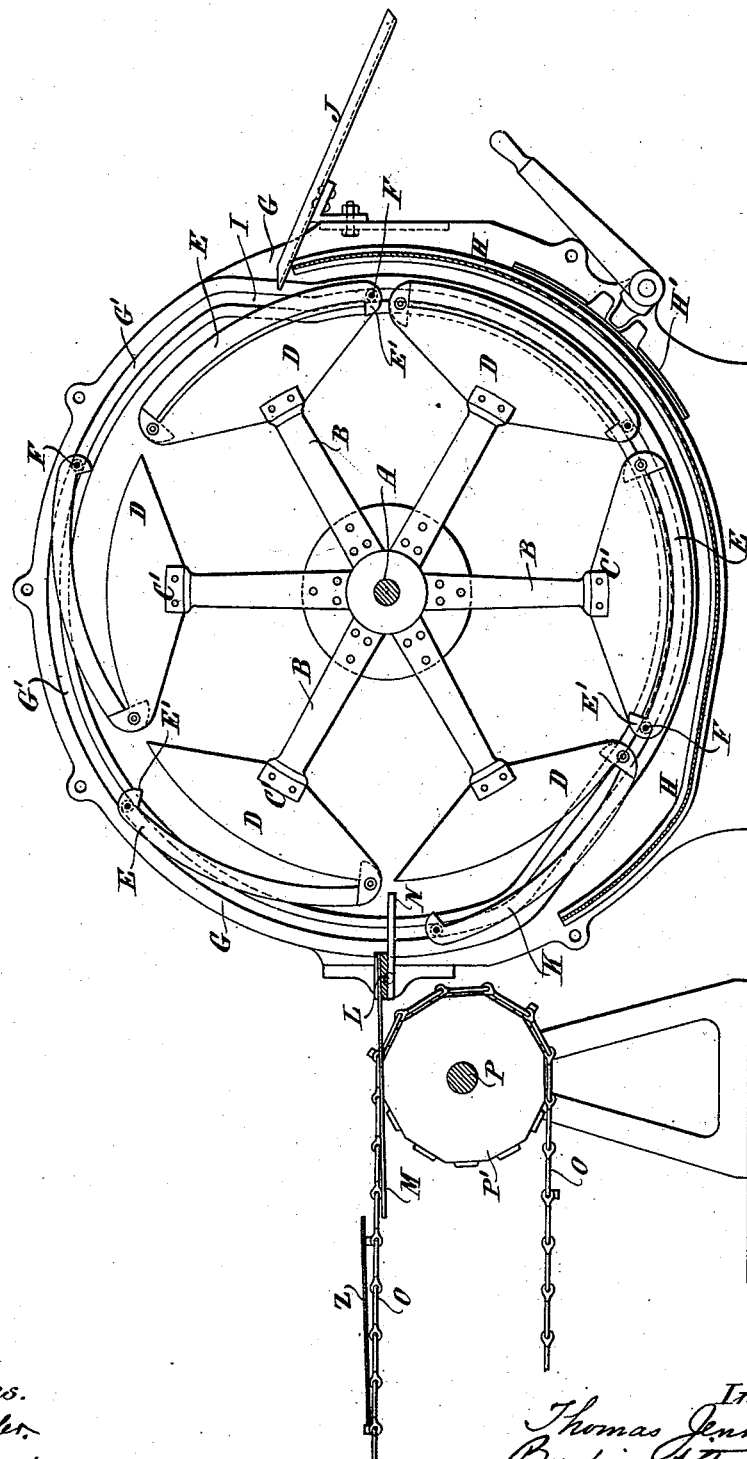

(No Model.) 4 Sheets—Sheet 1.

T. JENKINS.
APPARATUS FOR CLEANING TIN AND TERNE PLATES.

No. 485,387. Patented Nov. 1, 1892.

Witnesses.
P. M. Miller
C. F. Sensner

Inventor
Thomas Jenkins,
By his Attorneys,
Baldwin Davidson & Wight (No Model.) 4 Sheets—Sheet 2.

T. JENKINS.
APPARATUS FOR CLEANING TIN AND TERNE PLATES.

No. 485,387. Patented Nov. 1, 1892.

(No Model.)  4 Sheets—Sheet 3.

T. JENKINS.
APPARATUS FOR CLEANING TIN AND TERNE PLATES.

No. 485,387. Patented Nov. 1, 1892.

Fig. 3.

Witnesses.
P. M. Miller
C. F. Sensner

Inventor
Thomas Jenkins.
By his Attorneys,
Baldwin, Davidson & Wight (No Model.) 4 Sheets—Sheet 4.
T. JENKINS.
APPARATUS FOR CLEANING TIN AND TERNE PLATES.
No. 485,387. Patented Nov. 1, 1892.
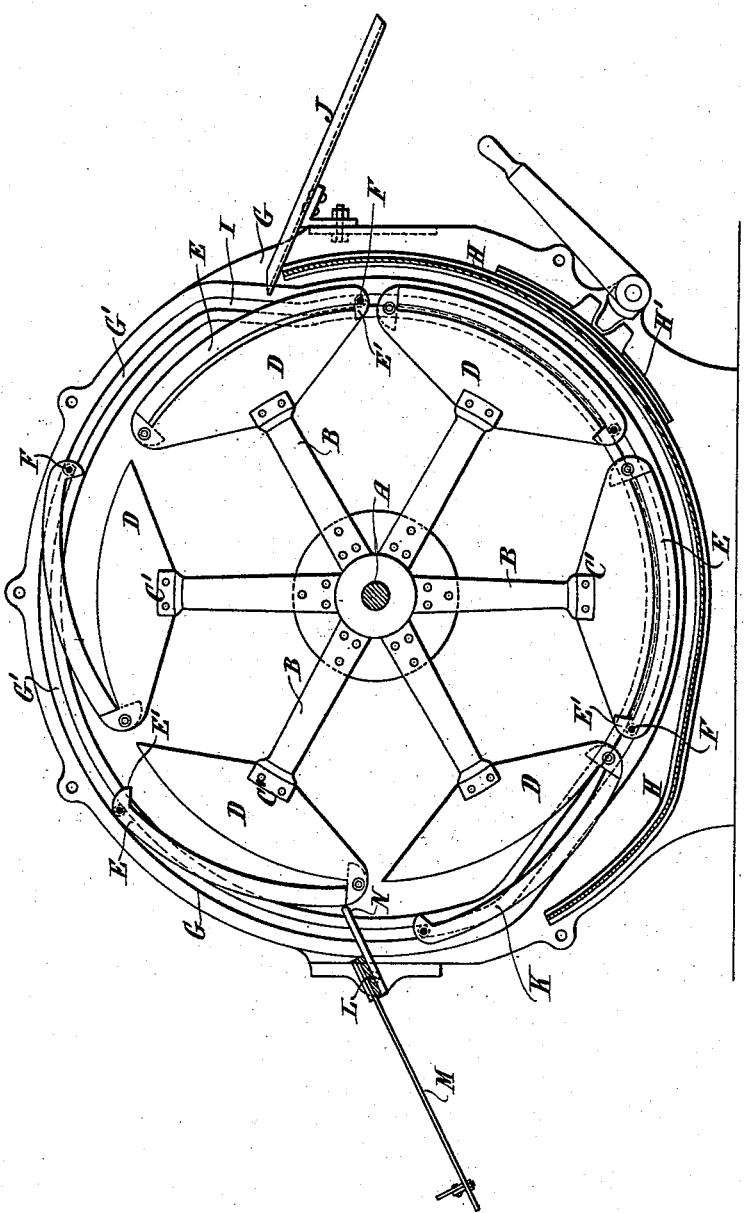

UNITED STATES PATENT OFFICE.

THOMAS JENKINS, OF LLANELLY, ENGLAND, ASSIGNOR TO JOHN HENRY ROGERS, OF SAME PLACE.

APPARATUS FOR CLEANING TIN AND TERNE PLATES.

SPECIFICATION forming part of Letters Patent No. 485,387, dated November 1, 1892.

Application filed April 25, 1892. Serial No. 430,526. (No model.)

*To all whom it may concern:*

Be it known that I, THOMAS JENKINS, fitter, a subject of the Queen of Great Britain, residing at Messrs. E. Morewood & Co.'s South Wales Steel, Iron, and Tin Plate Works, Llanelly, in the county of Carmarthen, England, have invented certain new and useful Improvements in Apparatus for Cleaning Tin and Terne Plates, of which the following is a specification.

For cleaning tin and terne plates after they have been taken from the finishing grease-pot I cause the plates to be delivered one by one to hinged holders, constructed as hereinafter described, ranged around the circumference of a horizontal revolving drum, the lower part of which is immersed in a vessel filled with bran or other cleaning material. As the drum revolves the plates are carried down within the holders into and through the cleaning material, and when they have been raised up from it the holders open and the plates are discharged one after the other in a cleaned state. The drum I form of rings or segments carried concentrically at a distance apart from one another from an axis to which a continuous revolving motion is imparted. Each of the holders which are ranged around the circumference of the drum I form of a number of curved parallel bars set side by side at a distance apart from one another. These at one end are free to turn upon a spindle, which is parallel with the axis of the drum and is carried by the drum-rings. At their other ends the bars are secured to a rod, the ends of which are made to enter into cam-grooves formed in two fixed plates which are one on either side of the drum. As the drum revolves the cam-grooves cause the holder to turn somewhat outward from the drum to allow of a plate being inserted between them or to turn into a position concentric with the drum to retain the plate. Inward projections from the ends of the curved bars which form the holder serve as stops for the plate to rest against when the holder is closed. The drum is revolved in such a direction that the ends of the holders which are hinged to the drum first enter the vessel which holds the bran or cleaning material. As the hinged end of each holder is carried down toward the vessel containing the cleaning material, the holder is held open by the action of the cam-groove and a plate is dropped between it and the drum. The holder is then by the action of the cam-groove caused to close and retain the plate, and the plate is carried around with the drum through the cleaning material. When the plate has been carried up out of the vessel, the cam-grooves cause the holder to open and the cleaned plate drops away clear of the vessel, while the holder remains open until it has come into position for another plate to have been delivered into it.

In some cases I employ endless chains to convey the plates from the finishing-pot and deliver them one by one to the holders. The boy who takes the plates from the finishing-pot places them one by one onto the top of the chains with that edge foremost which comes first from the pot. Each plate, therefore, as it passes from off the chains into the holders has still the same edge foremost and is carried through the cleaning material still with this edge foremost, so that the grease which always remains accumulated along the edge which last leaves the finishing-pot is at once brushed off away from the plate and not smeared over it. The chains are driven at such a speed relatively to the drum that there is always one of the holders on the drum ready to receive each plate as it is tilted from off the chains. The chains also are of such length that each plate placed upon it has just time to cool sufficiently for the coating metal upon it to set before the plate is delivered to the drum to be carried through the cleaning material. When working with thin plates, the endless chains are unnecessary, and the boy who takes the plates from the pot can at once drop them onto a table with that edge which came first from the pot toward the drum to be at once delivered with that edge foremost into the cleaning-machine so soon as one of the holders comes into position for a plate to be dropped into it.

If desired, two or more drums may be used in succession to carry the plates successively through two or more baths of bran or cleaning material.

The drawings annexed show apparatus constructed as above described.

Figure 2:
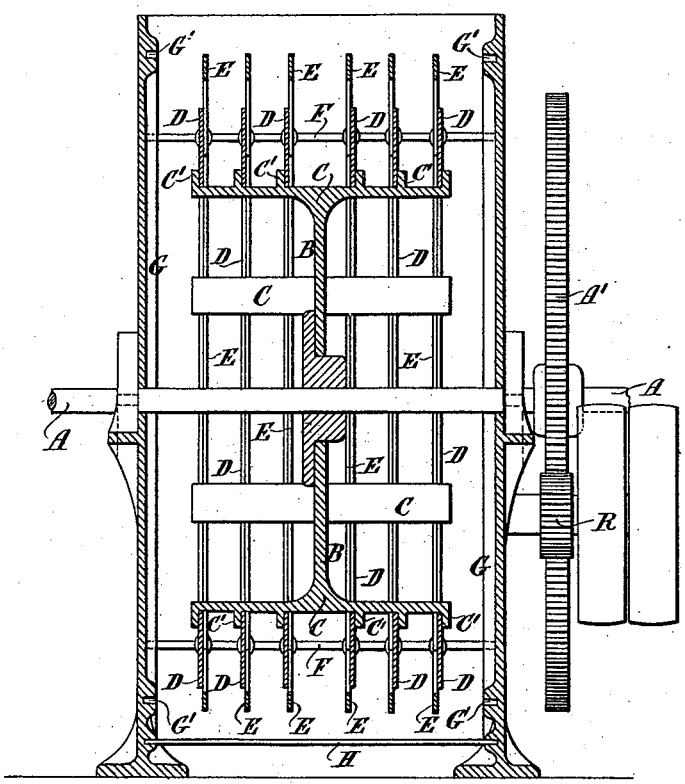

Figures 1 and 2 are vertical sections, and Fig. 3 a plan view. Fig. 4 is a similar view to Fig. 1 of the machine, as modified, when no endless carrying-chain is used.

A is a revolving shaft. B B are arms radiating from it, each carrying at its end a bar C, parallel with the shaft. Each bar has radial projections C' standing out from it at a distance apart from one another. To each radial projection is riveted a plate D, the outer edge of which is curved concentrically with the shaft. To one end of each plate is pin-jointed one end of a bar E, the other end of which is formed into a hook E'. A rod F is passed through the hooked ends of all the bars and its ends enter into cam-grooves G', formed in fixed side frames G.

H is a trough containing bran or other cleaning material, and H' a door to allow of the cleaning material being readily emptied out from the trough whenever required.

The cam-grooves G' are at the point I formed, as shown, to move the hooked ends E' of the bars E away from the shaft A, so that any plate previously held between the bars E and the segments D is allowed to drop away and fall onto an inclined table J. At the point K the cam-grooves are formed to move the hooked ends of the bars E toward the shaft and to make these hooked ends enter between the segments D, so as to prevent any plate which has been placed between the bars E and the segments from escaping from between them.

In order to drop a plate between the segments and hooked bars as each set of segments and bars is carried past the point K, an axis L is mounted in bearings just above this point and carries a table or series of parallel bars M. Normally the table rests in a nearly-horizontal position, as shown in Fig. 1, and while in this position a plate Z is carried over it by the endless chains O.

P is a shaft with polygonal wheels P' upon it, over which the endless chains pass; Q, a toothed wheel fast on the shaft and by which the spindle has a continuous revolving motion imparted to it.

R is a toothed wheel gearing with the toothed wheel Q and also with a toothed wheel A' on the shaft A. By it a continuous revolving motion is imparted to both of the shafts A and P. Projecting from the axis L, which carries the table, are fingers N, against which the rods F strike as they are carried round past them. As each rod strikes the fingers it gives a partial turn to the axis and tilts the table into the position shown by dotted lines. The plate then slips off from the table and drops between the bars and segments and then gets held between them, as above described, and is carried through the bran or cleaning material in the trough H and discharged from the trough when it has been carried past the point I.

For many purposes the plates when discharged from the trough and subsequently dusted or brushed will be sufficiently cleaned; but, if desired, they may as they are discharged from the holders of one cleaning-machine be dropped into the holders of a second similar machine and be by them carried through a further quantity of cleaning material.

If endless chains are not employed to convey the plates from the finishing-pot to the cleaning-machine, the bars or table M may normally when at rest be in an inclined position, as shown in Fig. 4, and when in this position a plate can be placed into it by hand, so as to be ready to be delivered at the proper time into one or other of the holders which convey the plates through the cleaning material.

What I claim is—

1. The combination of the carrier M, the tipping feed-table L at the inner end thereof, the revolving drum, carriers or holders mounted thereon and carried around thereby, a cleaning-trough, means for revolving the drum, means for opening and closing the holders, and means for actuating the carrier and for tipping the table, the organization being such that the carrier delivers the plate to the feed-table, which is tipped by the drum at the proper time to cause it to drop the plate into a holder, by which it is carried through a cleaning-trough.

2. The combination of a continuously-revolving horizontal drum provided with a series of holders, each consisting of a member D, which is fixed to the frame of the drum, and a member E, which is pivoted to the drum at one end, endless cam-grooves G', connections between these grooves and the outer ends of the movable members E of the clamps, and a cleaning-trough, the organization being such that each holder is closed as soon as a plate has entered it, is kept closed while the plate is carried through the cleaning-trough, and opened at the proper time to permit the cleaned plate to fall out.

3. The plate-holders herein described for carrying plates through a trough of cleaning material, comprising parallel plates D and hinged bars E, having hooks on their outer ends, the hooked ends of said bars being arranged to alternately enter between and to move away from the plates D, so as to first take hold of and subsequently release a plate, substantially as described.

4. The combination of the shaft A, plates D, hooked bars E, cam-grooves G', and trough H, substantially as described.

5. The combination of a revolving drum and a series of plate-holders, each comprising a series of parallel plates D, a series of bars E, hinged at one end and provided with hooks at their outer ends, and means for moving the bars on their hinges toward and from the plates D, substantially as described.

THOMAS JENKINS.

Witnesses:
   WILLIAM REES,
      5 *Goring Terrace, Llanelly.*
   E. FRANKLYN DAVIES,
      7 *Greenfield Terrace, Llanelly.*